Oct. 15, 1968     G. D. RINGLE     3,405,898
MOUNTING BRACKET
Filed June 24, 1966
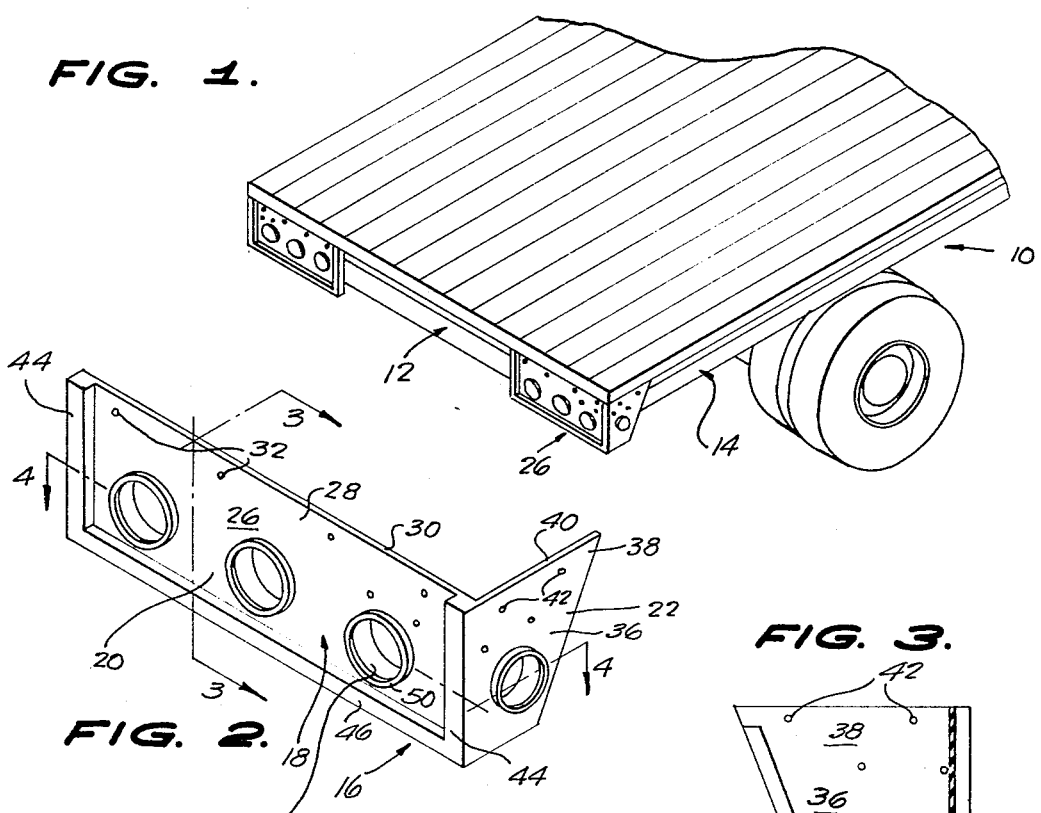
INVENTOR.
GERALD D. RINGLE,
BY
Robert L. McMorrow
ATTORNEY.

United States Patent Office 3,405,898
Patented Oct. 15, 1968

3,405,898
MOUNTING BRACKET
Gerald D. Ringle, c/o St. Louis Freight Lines, Box 493,
Michigan City, Ind. 46360
Filed June 24, 1966, Ser. No. 560,240
2 Claims. (Cl. 248—204)

ABSTRACT OF THE DISCLOSURE

In a heavy duty road vehicle of the semi-trailer type, a rear light support bracket formed of rubber or the like has openings for lamps with surrounding retaining means for light fixtures, and has conduits to enclose wiring for the fixtures.

---

Light failures occasioned by various causes are a source of substantial difficulty to the automotive trade generally and particularly to the trucking industry. Due to lack of standardization of bulbs and other parts, and the frequency of necessity for replacement, large stocks of replacement lamps must be maintained and much time is consumed in lighting repairs and replacements. Further, due to short bulb life, highway safety of operating vehicles is impaired. Light failures are known to be caused by three major problems. First, lamps are subjected to road shock which in turn causes filament failure. Secondly, lamp mounts and casings are exposed seasonly to corrosive chemicals such as salts used to melt ice on highways, and thirdly, since lamp mounts are often constructed of metals different from the metal of the vehicle body, electrical currents are developed rendering the lamp mounts especially susceptible to corrosion. To overcome these causes of lamp failure, and for other purposes hereinafter set forth in detail, it is a primary object of the present invention to provide a non-rigid mounting for vehicle lights which serves as a mount and a protector therefor.

Additional objectives of the invention include the provision of a mounting bracket for vehicle lights which is resistant to shock damage, and one which excludes moisture and is resistant to short circuiting of electrical equipment.

A further advantage of the aforementioned invention resides in the ease of replacement of light assemblies occasioned, thereby saving in repair time and loss of vehicle use during repair.

Still another object is to provide a light mounting bracket and light assembly adapted for installation as a unit, thus effecting an improvement in the manner of assembly of trucks, trailers, and the like.

Yet a further objective hereof is to supply a light mounting bracket which is resistant to impact damage from minor collisions, backing of a vehicle against a loading dock, etc.

Other and further objects and advantages of the present invention will become apparent to those skilled in the art from a consideration of the following specification, when read in conjunction with the annexed drawing, in which:

FIGURE 1 is a perspective view of the rear portion of a vehicle having a pair of mounting brackets constructed and assembled in accordance with this invention in place thereon;

FIGURE 2 is a perspective view on an enlarged scale of the bracket per se;

FIGURE 3 is a further enlarged sectional view, taken substantially on the line 3—3 of FIGURE 2, looking in the direction of the arrows; and FIGURE 4 is a horizontal sectional view taken on the line 4—4 of FIGURE 2, looking in the direction of the arrows.

Referring to the drawing in more detail, reference numeral 10 generally designates the rear portion of a vehicle of conventional type, such as a flat bed truck having an electrical power source and wiring system (not shown) for supplying electrical energy to its rear lights. It is desirable, and in fact safety regulations require, that lights be displayed at various locations on highway vehicles, such as the truck 10, including lights displayed at the back 12 and sides 14 thereof.

The mounting bracket of the present invention is identified in the drawing by reference numeral 16 and is formed, by a molding process or otherwise, from a non-metallic, resilient substance such as rubber. The bracket 16 comprises a unitary main body portion 18 having an elongated, flat rear wall 20 and a side wall 22. The rear wall has an inner face 24, an outer face 26 and a top edge section 28 terminating in an edge 30. The top edge section 28 has a plurality of openings 32 formed therein, for a purpose appearing below. The side wall 22 also has opposite inner and outer faces 34, 36, a top edge section 38 terminating in an edge 40, and openings 42 extending transversely therethrough.

Formed integrally at the sides and bottom of the walls are enlarged sections 44, 46 which strengthen and rigidify the mounting bracket. The sections are arranged to extend from the inner face 34 of the side wall and from the outer face 26 of the rear wall. Formed with the rear wall is a row of substantially tubular mounting sleeves 48 which extend through the wall on each side thereof and have inwardly directed, circumferential flanges 50 defining the open forward portions thereof. The number of mounting sleeves to be provided is variable, but as shown, may include three such sleeves on the rear wall for the accommodation of a stop light, a back-up light and a tail light at each side of the vehicle. The sleeves are arranged to engage vehicle light assemblies, not shown, with the inward flanges 50 serving to retain the assemblies in place therein. As shown in the drawing, the sleeves are enclosed at their rear sides by back walls 52, and the light assemblies fit between these back walls and the flanges with the lens portion exposed across the opening defined by the flange.

The side wall 22 also has a generally tubular sleeve of a construction identical to that before described, but optionally of smaller dimension for the accommodation of a side clearance light. The housing 54 includes a rear wall 56 and forward flange 58.

Extending between each of the housings 48 and the housing 54 is a tubular wiring enclosure 60 serving to protect the light wiring (not shown) from exposure to chemical contact, moisture, and the like. An arcuate shield 62 extends from the sleeve 54 to an adjacent sleeve 48 for the same purpose.

Necessary reflectors may be attached to the body portion 18 at any selected location, and apertures may optionally be provided for this purpose.

In view of the non-conductive nature of the material of fabrication of the body portion 18, it is necessary that each fixture be separately grounded by a wire extending from its housing to the truck body, and these ground wires may be grounded in such a manner as the circumstances of each installation renders necessary.

The bracket is adapted for attachment to the truck body by the extension of fastening means through the openings 32 and 42 provided for that purpose.

It will be observed in FIGURE 1 that opposite hand forms of the main body portion 18 are supplied for each of the sides 14 of the vehicle.

Having described and illustrated an embodiment of this invention in some detail, it will be understood that this description and illustration have been offered only by way of example, and that the invention is to be limited in scope only by the appended claims.

What is claimed is:

1. In a vehicle light bracket for attachment to a corner portion of a vehicle, the vehicle having a light system including at least two lamp assemblies with associated electrical wires, the lamp assemblies being mounted adjacent the corner portions of the vehicle, the bracket comprising:

a unitary main body portion formed of a resilient substance of minimum electrical conductivity;

said main body portion having double rear and side walls each including an outer face related to one another at substantially a right angle, each wall having an inner side and an outer side;

fastening means extending through the walls to secure the main body portion to the corner portion of the vehicle;

a tubular mounting sleeve extending through the outer face of each of the walls and opening outwardly;

flange means about the sleeves adjacent to each opening;

the vehicle lamp assemblies being disposed in the sleeves and being engaged by the flange means thereof; and hollow conduits interconnecting the sleeves, the electrical wires being disposed in the conduits.

2. The invention of claim 1, wherein:
at least one of the walls has rigidifying flange means thereabout.

References Cited

UNITED STATES PATENTS

| 1,301,741 | 4/1919 | Raul | 240—8.3 XR |
| 1,566,131 | 12/1925 | Tucker. | |
| 1,816,741 | 7/1931 | Orester. | |
| 2,099,405 | 11/1937 | Langdon | 248—204 XR |
| 3,107,061 | 10/1963 | Morgan | 240—8.3 XR |
| 3,184,590 | 5/1965 | Nagel | 240—8.3 XR |

FOREIGN PATENTS

| 247,129 | 9/1963 | Australia. |
| 816,784 | 7/1959 | Great Britain. |

ROY D. FRAZIER, *Primary Examiner.*

A. FRANKEL, *Assistant Examiner.*